United States Patent [19]

Gutmann

[11] Patent Number: 4,504,878
[45] Date of Patent: Mar. 12, 1985

[54] SYSTEM FOR STORING AND AUTOMATICALLY RETRIEVING RECORDING DISCS

[76] Inventor: John W. Gutmann, 4581 Lucern Valley Rd., Lilburn, Ga. 30247

[21] Appl. No.: 416,030

[22] Filed: Sep. 8, 1982

[51] Int. Cl.³ .............................................. G11B 5/012
[52] U.S. Cl. ...................................................... 360/98
[58] Field of Search ................................... 360/98–99; 206/444

[56] References Cited

U.S. PATENT DOCUMENTS

| | | | |
|---|---|---|---|
| 4,127,882 | 11/1978 | Kohl et al. | 360/98 |
| 4,170,031 | 10/1979 | Beuch et al. | 360/98 |
| 4,173,427 | 11/1979 | Beuch et al. | 414/751 |
| 4,226,570 | 10/1980 | Holecek et al. | 360/98 X |
| 4,363,044 | 12/1982 | Castrodale et al. | 360/98 |

OTHER PUBLICATIONS

IBM/TDB, vol. 20, No. 12, May 1978, pp. 5281–5286, "Orient and Interlock Sensor . . . ", by Larson et al.

*Primary Examiner*—John H. Wolff
*Attorney, Agent, or Firm*—James J. Brown

[57] ABSTRACT

A mechanism is described for storing and automatically retrieving a plurality of recording discs such as floppy discs. A plurality of recording discs are vertically disposed in a cartridge which is adapted to be held on a horizontally movable carriage which positions the cartridge under the drive mechanism for receiving and recording or playing back information from the disc. The carriage holding the cartridge permits positioning of the cartridge in increments under the drive mechanism so that a particular recording disc can be inserted upward into the drive mechanism and retrieved from the mechanism. A device is disposed directly below the cartridge for pushing a particular recording disc upward out of the cartridge. Additional devices are disposed above the cartridge for engaging the disc as it is pushed upward and inserting it into the drive mechanism and returning it to the cartridge. Advantageously, all of the mechanisms of the device are connected into a unitary control system so that a particular recording disc can be easily selected and fed into the drive mechanism. Additional devices are provided for returning the recording disc to the cartridge by pushing downward on the top of the disc so that it is properly aligned for insertion back into the cartridge below the drive mechanism.

4 Claims, 4 Drawing Figures

SYSTEM FOR STORING AND AUTOMATICALLY RETRIEVING RECORDING DISCS

SUMMARY OF THE INVENTION

The present invention is directed to a mechanism for inserting into and withdrawing recording discs from a drive mechanism for reading or transcribing the disc. More particularly, the present invention is directed to an automatically controlled device which permits a substantial number of recording discs to be inserted into and retrieved from a reading/transcribing mechanism and which employs a casette device to store these magnetic recording discs.

BACKGROUND OF THE INVENTION

Recording discs have become widely used for the storage and retrieval of information. Particularly useful are magnetic storage discs such as the floppy discs which are frequently used in conjunction with computers. Such discs have many advantages, however, only a limited amount of information can be stored on a single disc and it is therefore desirable and often necessary to have a substantial number of such recording discs and to be able to insert and withdraw them from the computer mechanism as quickly and efficiently as possible. Previous devices, however, for retrieving information stored on these discs have frequently not permitted the quick and efficient substitution of one disc for another in order to read the information contained on the respective discs. It has been necessary, for example, to actually provide multiple drive mechanisms where multiple discs are needed.

It is accordingly an object of the present invention to provide a mechanism by which a substantial number of recording discs can be effectively and efficiently stored and the discs retrieved in any desired order and inserted in or withdrawn from a single drive mechanism for reading or transcribing the disc.

It is yet a further object of the present invention to provide a mechanism for the storage, insertion and retrieval of recording discs such as flexible magnetic recording discs, in which a cartridge is provided which holds a large number of such discs in a manner which permits their efficient, individual retrieval and insertion into the drive mechanism.

Other objectives and advantages of the present invention will, however, become apparent by having reference to the attached drawings which describe an embodiment of the present invention.

DETAILED DESCRIPTION OF AN EMBODIMENT OF THE INVENTION

Figure 1:
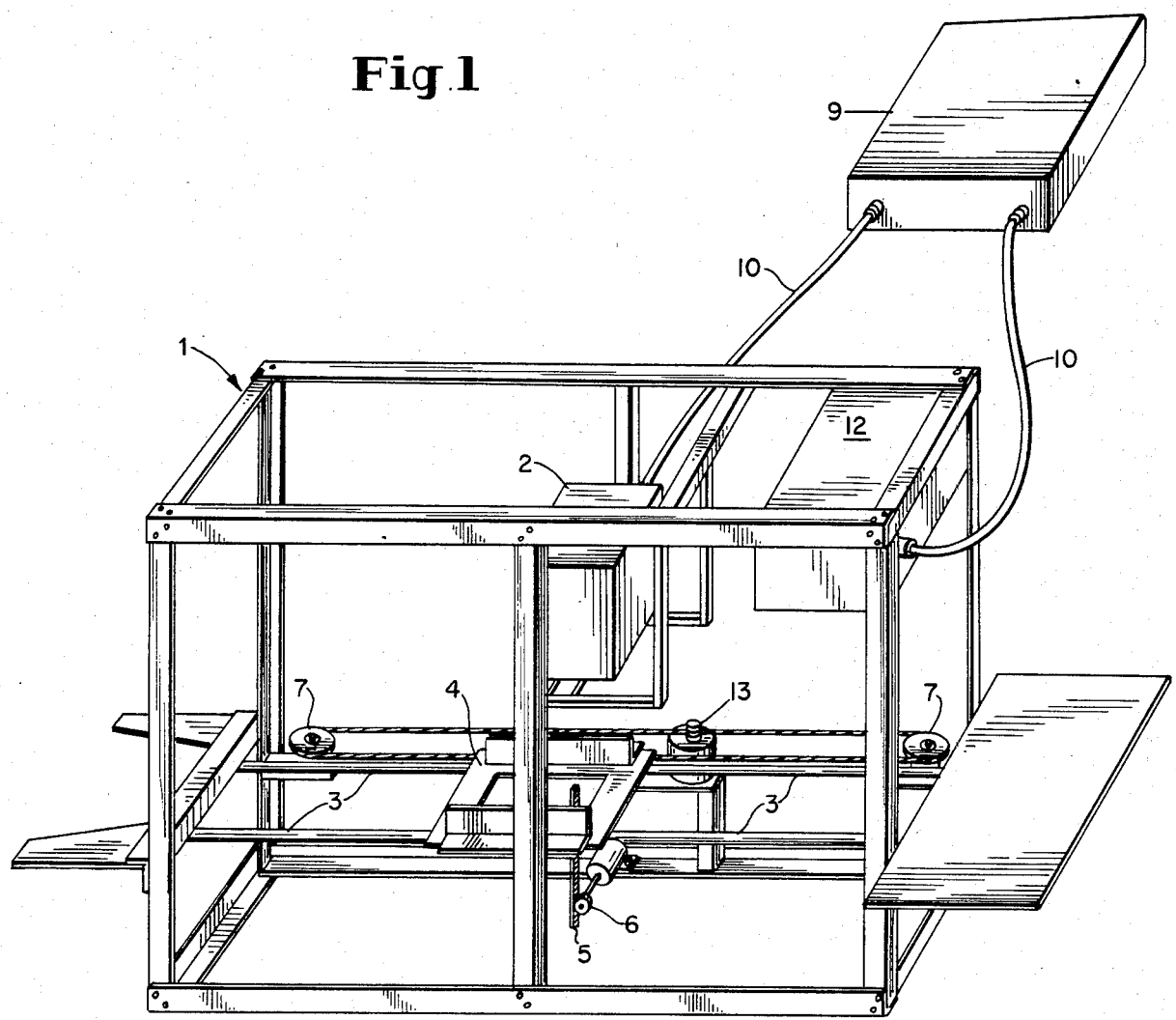
FIG. 1 shows the mechanism of the invention for retrieving any of a plurality of recording discs held in a cartridge.

Having reference to the drawings, FIG. 1 illustrates the mechanism of the invention for retrieving a recording disc such as a magnetic floppy diskette from a cartridge and inserting the disc into a drive mechanism for reading or transcribing information therefrom. A generally rectangular frame 1 is shown having two parallel, horizontal carriage rails 3 mounted in the lower portion thereof. Slidably mounted on the carriage rails is a carriage 4 which is adapted to receive the generally cubical disc cartridge shown in FIG. 2 of these drawings. The carriage 4 is moved horizontally along the carriage rails by means of a pulley 7 or similar drive mechanism which is driven by a suitable motor mechanism shown at 13. Mounted vertically above the carriage and carriage rails is a drive mechanism 2 for receiving the recording disc and either reading the recorded information off of the disc or transcribing new information onto it. The drive and reading/transcribing mechanism is of conventional design but is adapted to receive the flexible disc from the underside of the mechanism and subsequently release it, on signal, to the cartridge. Directly under the drive mechanism are a pair or opposed wheels 8 having frictional surfaces for grasping the disc and pushing it up into the mechanism as well as guiding its return to the cartridge. It is understood that these wheels or rollers are suitable driven by a small motor which is not shown. Also not shown, but illustrated in FIG. 3 is an arm 17 located on the underside of the drive mechanism 2 for completing insertion of the diskette into the drive and facilitating its alignment and return to the carriage. Mounted directly below the slot in the floppy drive mechanism which receives the disk and below the carriage rails is a mechanism for displacing a single disc from the cartridge carried in the carriage. The illustrated device consists of a rack and pinion unit which is a rod 5 having a toothed surface which engages a gear 6. The rack or rod is vertically mounted in alignment with the slot in the drive mechanism so that when it is driven upward by the turning of the gear 6 it projects into the bottom of the cartridge which is partially open and displaces the single disc immediately over it in an upward direction to engage the friction wheels 8. The motor which drives the gear 6 causing the rod 5 to move upward is, of course, synchronized in its operation with the motor driving the wheels 8 so that the two essentially operate contemporaneously to insert the recording disc into the drive unit. Once the disc is seated in place in the drive unit, the rod 5 retracts so as not to interfere with return of the disc to the cartridge. A motor 13 is provided to engage the pulley cable 7 in order to move the carriage horizontally along the rails 3.

Although not shown in the drawing, it will be understood that the present invention further contemplates appropriate stop, start and control means for facilitating the locating of the carriage 4 in the correct position under the drive mechanism and for incrementally advancing the carriage in either direction in order to position selected discs under the drive mechanism. For example, stops may be provided on the carriage itself corresponding to the slots in the cartridge so that once the carriage is positioned under the drive mechanism it can then be moved one slot or disc at a time either to the left or right. Advantageously, optical and electro-optical means can be employed such as photoelectric sensors to determine the position of the carriage. It will further be appreciated that the entire operation of the unit including the drive mechanism is most conveniently controlled from a control box 12 which in turn is connected to the computer 9 which communicates through cables 10 with the drive mechanism. In this manner, once the cartridge containing the recording discs is positioned either manually or automatically within the carriage, all other operation including movement and positioning of the carriage and insertion of the desired disc into the drive unit can be controlled from the computer quickly and efficiently.

Figure 2:
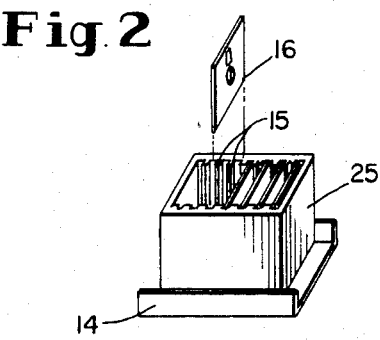
FIG. 2 illustrates a cartridge of the present invention for holding a plurality of recording discs.
Figure 3:
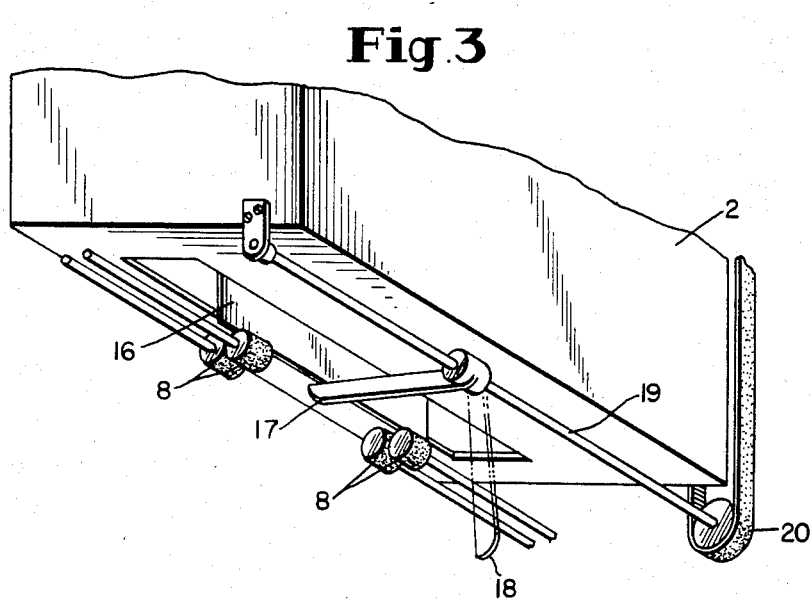
FIG. 3 is a view of the bottom side of the drive mechanism illustrating the feed rollers and arm.

FIG. 2 of the drawings illustrates the generaly cubical cartridge which is employed in the present invention both for storage and retrieval of the recording discs which are used in the invention. The cartridge consists essentially of a base member 14 which is partially open at the bottom to permit insertion of the positioning rod 5 shown in FIG. 1. On the base 14 of the cartridge a cubical frame sits which is open at the top and which contains a plurality of vertical opposed pairs of slots 15 adapted to each carry a single recording disc 16. It will be apparent that the cartridge can be constructed of various sizes to accommodate a large number of recording discs.

FIG. 3 is a view of the bottom side of the drive mechanism 2 illustrating the pair of feed rollers 8 which feed the diskette 16 into the drive and facilitate its return to the cartridge below (not shown). Since the pair of rollers 8 can not insert the diskette completely into the drive unit, a "kicker" arm 17 is provided mounted on a drive rod 19. The drive rod is turned by a suitable mechanism 20 which is conveniently synchronized with the action of fhe rollers 8 to "follow" the diskette into the drive unit and then complete insertion of the diskette into the drive once the diskette has been projected as far as possible by the rollers. Once the diskette is inserted and engaged within the drive mechanism, the "kicker" arm rotates downward to a rest position 18, so as to be clear of the diskette during the operation by which it is returned to the cassette. The mechanisms by which the kicker arm and drive rod are operated is not shownl but will be apparent to those skilled in the art.

Figure 4:
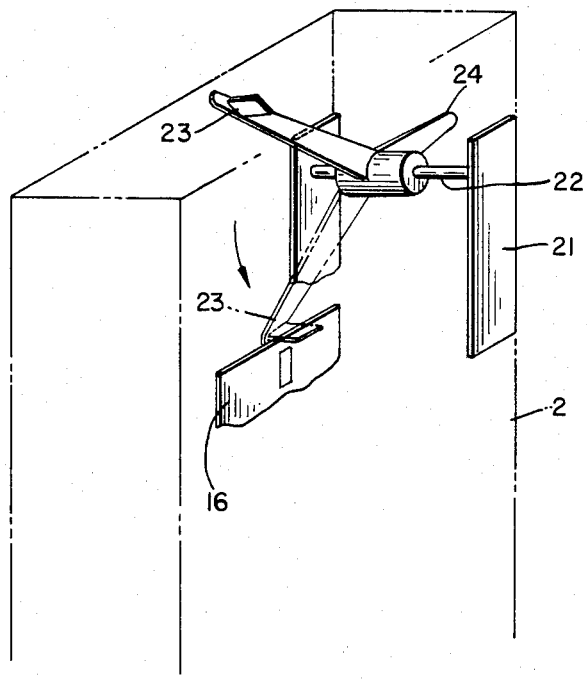
FIG. 4 is a top view of the drive mechanism showing the disc ejector arm.

FIG. 4 shows a top view of the drive mechanism 2 and illustrates the ejector arm 23 which pushes the diskette downward, out of the drive unit and into engagement with the rollers 8 (not shown in FIG. 4). This injector arm is conveniently linked to the control mechanism device and the rollers 8 so that its activation can be the initial step in the sequence of events that return a diskette from the drive unit to the cassette. The ejector arm 23 is attached to a horizontal shaft 22 rotatably mounted between upright brackets 21. An offset arm 24 is positioned on the shaft 22 so that its upward movement causes the ejector arm to rotate downward to engage the top edge of the diskette 16 and force it downward. Counter rotation of the arm 24 downward, causes upward movement of the ejector arm 23. The actual mechanism by which the offset arm 24 is moved is not shown but can be by suitable gears, pulleys or similar devices known in the art, and as noted, is advantageously interconnected with the rollers, kicker arm, and insert rod 5, which facilitate movement of each diskette between the cassette and the drive unit.

Once a particular recording disc is finished with, in the drive mechanism, the mechanism permits the disc to be ejected downward back into the frictional wheels 8 mounted below the drive mechanism and from there it is re-inserted vertically into its slot in the cartridge still maintained in position directly below it. Additional individual recording discs may then be selected and inserted into the drive mechanism as desired by simply re-positioning the carriage carrying the cartridge under the drive mechanism and activating the insertion mechanism to insert the next desired disc into the drive.

Various modifications and the implementation of devices and technologies known in the art in conjunction with the present invention will be apparent to those skilled in this field.

What is claimed is:

1. A device for the storage and retrieval of recording discs comprising:
    (a) a cartridge means having an open top and opposing, vertical slots on opposite inside walls to accommodate a plurality of said recording discs;
    (b) a horizontally movable carriage to hold said cartridge and position it under means for receiving and recording or playing back information from each of said plurality of discs;
    (c) horizontal track means for positioning said carriage under said means for receiving and recording or playing back information;
    (d) means for causing said carriage to move on said track means;
    (e) means positioned under said track means for displacing one of said plurality of discs from said cartridge vertically upward toward said recording/playback means disposed above the carriage;
    (f) means positioned between said carriage and said receiving and recording or playing back means for passing said one disc, when received from said cartridge, into the receiving and recording or playing back means and guiding its return downward to the cartridge.

2. The device of claim 1 wherein said means for passing said one disc into the receiving and recording or playing back means includes frictional roller means for engaging said one disc and inserting it into the receiving and recording or playing back means and, disposed between said rollers and receiving and recording or playing back means, means for engaging the bottom edge of said disc and completing its insertion into said receiving and recording or playing back means.

3. The device of claim 1 wherein means are provided for ejecting the recording disc from the record/playback means in a downward direction for re-introduction into said cassette.

4. The device of claims 2 or 3 wherein each of said means for moving the carriage, means for displacing the disc from the cartridge, means for passing said disc to the receiving and recording or playing back means and said disc ejector means are driven by an electric motor whose operation is coordinated and controlled from a single station.

* * * * *